(12) United States Patent
Wang et al.

(10) Patent No.: US 12,273,883 B2
(45) Date of Patent: Apr. 8, 2025

(54) RESOURCE MANAGEMENT AND DYNAMIC SIDELINK SEARCH SPACE FOR NEW RADIO SIDELINK

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US); Xiaoxia Zhang, San Diego, CA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 793 days.

(21) Appl. No.: 17/443,767

(22) Filed: Jul. 27, 2021

(65) Prior Publication Data
US 2022/0039078 A1    Feb. 3, 2022

Related U.S. Application Data

(60) Provisional application No. 63/058,287, filed on Jul. 29, 2020.

(51) Int. Cl.
*H04W 72/20* (2023.01)
(52) U.S. Cl.
CPC .................................. *H04W 72/20* (2023.01)
(58) Field of Classification Search
None
See application file for complete search history.

(56) References Cited

U.S. PATENT DOCUMENTS

| | | | |
|---|---|---|---|
| 2021/0051654 A1* | 2/2021 | Wang | H04L 1/1887 |
| 2021/0105746 A1* | 4/2021 | Sarkis | H04W 72/04 |
| 2021/0250954 A1* | 8/2021 | Li | H04W 72/56 |
| 2021/0258919 A1* | 8/2021 | Choi | H04W 72/02 |
| 2021/0410158 A1* | 12/2021 | Xue | H04W 72/121 |
| 2022/0022178 A1* | 1/2022 | Wang | H04W 72/20 |
| 2022/0030648 A1 | 1/2022 | Wang et al. | |
| 2022/0095277 A1* | 3/2022 | Aiba | H04W 72/20 |
| 2022/0159626 A1* | 5/2022 | Yeo | H04L 5/0094 |
| 2023/0124233 A1* | 4/2023 | Lee | H04W 72/25 |
| | | | 370/329 |

* cited by examiner

*Primary Examiner* — Nguyen H Ngo
(74) *Attorney, Agent, or Firm* — Arent Fox LLP

(57) ABSTRACT

Aspects of the present disclosure provide techniques for configuring a search space for sidelink communications between one or more sensors/actuators (SAs) and programmable logic controller (PLC) in internet of things (IoT) applications in order to minimize the number of subchannels that a receiver (e.g., PLC or SA) may need to blind decode. More particularly, the search space is configurable based on a hashing function that is based in part on a portion of the resources (e.g., PLC resources) that have been allocated or reserved for sidelink communication within the PLC subnetwork (or PLC group) from the sidelink resource pool available to a plurality of PLCs in a network. By limiting the search space to a subset of resources that are specific to the PLC subnetwork or group, the need for the SA or PLC to perform blind decoding of sidelink control information (SCI) may be further reduced.

20 Claims, 7 Drawing Sheets

RESOURCE MANAGEMENT AND DYNAMIC SIDELINK SEARCH SPACE FOR NEW RADIO SIDELINK

CROSS-REFERENCE TO RELATED APPLICATION(S)

The present application claims benefit of U.S. Provisional Application No. 63/058,287 entitled "RESOURCE MANAGEMENT AND DYNAMIC SIDELINK SEARCH SPACE FOR NEW RADIO SIDELINK" filed Jul. 29, 2020, which is assigned to the assignee hereof and hereby expressly incorporated by reference herein

TECHNICAL FIELD

The present disclosure relates to wireless communication systems, and more particularly, to techniques for resource management and dynamic search space configuration for sidelink communications between one or more sensors/actuators (SAs) and programmable logic controller (PLC) in internet of things (IoT) applications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for configuring a search space for sidelink communications between one or more sensors/actuators (SAs) and programmable logic controller (PLC) in internet of things (IoT) applications in order to minimize the number of subchannels that a receiver (e.g., PLC or SA) may need to blind decode. More particularly, the search space is configurable based on a hashing function that is based in part on a portion of the resources (e.g., PLC resources) that have been allocated or reserved for sidelink communication within the PLC sub-network (or PLC group) from the sidelink resource pool available to a plurality of PLCs in a network. By limiting the search space to a subset of resources that are specific to the PLC subnetwork or group, the need for the SA or PLC to perform blind decoding of sidelink control information (SCI) may be further reduced, thereby maximizing hardware resources (e.g., by using less processing power and bandwidth) for sidelink communications.

In one example, a method for wireless communication is disclosed. The method may include reserving, at a first user equipment (UE), a portion of resources from a sidelink resource pool available to a plurality of first UEs in a network. The method may further include generating resource information for one or more second UEs associated with the first UE that identifies the portion of the resources from the sidelink resource pool that have been reserved for the first UE. In some examples, the portion of the resources that are reserved for the first UE may be used for sidelink communication between the first UE and the one or more second UEs. The method may further include transmitting a resource message to the one or more second UEs that includes the resource information. The resource information may be used to configure search space for monitoring transmissions within a set of subchannels that are calculated based on the portion of the resources that have been allocated to the first UE from the sidelink resource pool.

In another example, an apparatus for wireless communications. The apparatus may include a memory having instructions and a processor configured to execute the instructions to reserve, at a first UE, a portion of resources from a sidelink resource pool available to a plurality of first UEs in a network. The processor may further be configured to execute the instructions to generate resource information for one or more second UEs associated with the first UE that identifies the portion of the resources from the sidelink resource pool that have been reserved for the first UE. In some examples, the portion of the resources that are reserved for the first UE may be used for sidelink communication between the first UE and the one or more second UEs. The processor may further be configured to execute the instructions to transmit a resource message to the one or more second UEs that includes the resource information. The resource information may be used to configure search space for monitoring transmissions within a set of subchannels that are calculated based on the portion of the resources that have been allocated to the first UE from the sidelink resource pool.

In some aspects, a non-transitory computer readable medium includes instructions stored therein that, when executed by a processor, cause the processor to perform the steps of reserving, at a first UE, a portion of resources from a sidelink resource pool available to a plurality of first UEs in a network. In some examples, the processor may further perform the steps of generating resource information for one or more second UEs associated with the first UE that identifies the portion of the resources from the sidelink resource pool that have been reserved for the first UE. In some examples, the portion of the resources that are reserved for the first UE are to be used for sidelink communication between the first UE and the one or more second UEs. In some examples, the processor may further perform the steps of transmitting a resource message to the one or more second UEs that includes the resource information. In some examples, the resource information may be used to configure search space for monitoring transmissions within a set of subchannels that are calculated based on the portion of the resources that have been allocated to the first UE from the sidelink resource pool.

In certain aspects, another apparatus for wireless communication is disclosed. The apparatus may include means for reserving, at a first UE, a portion of resources from a sidelink resource pool available to a plurality of first UEs in a network. The apparatus may further include means for generating resource information for one or more second UEs associated with the first UE that identifies the portion of the resources from the sidelink resource pool that have been reserved for the first UE. In some examples, the portion of the resources that are reserved for the first UE may be used for sidelink communication between the first UE and the one or more second UEs. The apparatus may further include means for transmitting a resource message to the one or more second UEs that includes the resource information. The resource information may be used to configure search space for monitoring transmissions within a set of subchannels that are calculated based on the portion of the resources that have been allocated to the first UE from the sidelink resource pool.

In another example, another method for wireless communication is disclosed. The method may include receiving, at a first user equipment (UE), a resource message from a second UE that includes a resource information regarding a portion of resources that have been reserved by the second UE from a sidelink resource pool available. The method may further include configuring a search space for sidelink communication between the first UE and the second UE based on the resource information. In some examples, the search space may be a subset of subchannels calculated based in part on the portion of resources that have been reserved by the second UE. The method may further include monitoring, at the first UE, the subset of subchannels for sidelink transmissions from the second UE that are within the search space. The method may include decoding the sidelink transmissions from the second UE based on the monitoring of the subset of sub channels.

In another example, an apparatus for wireless communications. The apparatus may include a memory having instructions and a processor configured to execute the instructions to receiving, at a first user equipment (UE), a resource message from a second UE that includes a resource information regarding a portion of resources that have been reserved by the second UE from a sidelink resource pool available. The processor may further be configured to execute the instructions to configure a search space for sidelink communication between the first UE and the second UE based on the resource information. In some examples, the search space may be a subset of subchannels calculated based in part on the portion of resources that have been reserved by the second UE. The processor may further be configured to execute the instructions to monitor, at the first UE, the subset of subchannels for sidelink transmissions from the second UE that are within the search space. The processor may further be configured to execute the instructions to decode the sidelink transmissions from the second UE based on the monitoring of the subset of subchannels.

In some aspects, a non-transitory computer readable medium includes instructions stored therein that, when executed by a processor, cause the processor to perform the steps of receiving, at a first user equipment (UE), a resource message from a second UE that includes a resource information regarding a portion of resources that have been reserved by the second UE from a sidelink resource pool available. In some examples, the processor may further perform the steps of configuring a search space for sidelink communication between the first UE and the second UE based on the resource information. In some examples, the search space may be a subset of subchannels calculated based in part on the portion of resources that have been reserved by the second UE. In some examples, the processor may further perform the steps of monitoring, at the first UE, the subset of subchannels for sidelink transmissions from the second UE that are within the search space. In some examples, the processor may further perform the steps of decoding the sidelink transmissions from the second UE based on the monitoring of the subset of sub channels.

In another example, an apparatus for wireless communications is disclosed. The apparatus may include means for receiving, at a first user equipment (UE), a resource message from a second UE that includes a resource information regarding a portion of resources that have been reserved by the second UE from a sidelink resource pool available. The apparatus may further include means for configuring a search space for sidelink communication between the first UE and the second UE based on the resource information. In some examples, the search space may be a subset of subchannels calculated based in part on the portion of resources that have been reserved by the second UE. The apparatus may further include means for monitoring, at the first UE, the subset of subchannels for sidelink transmissions from the second UE that are within the search space. The apparatus may further include means for decoding the sidelink transmissions from the second UE based on the monitoring of the subset of subchannels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
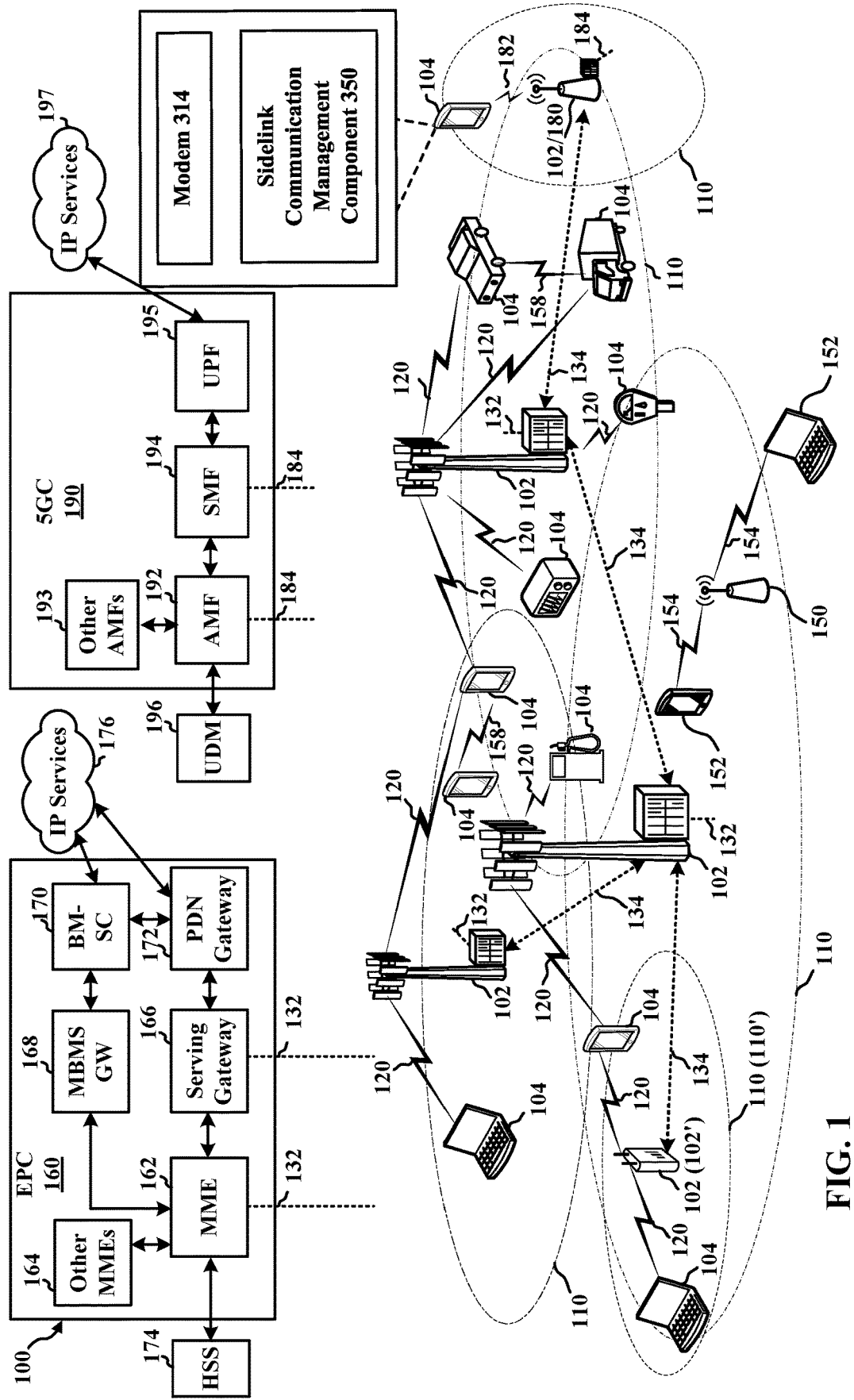
FIG. 1 is a schematic diagram of an example of a wireless communications system in accordance with aspects of the present disclosure.

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. One solution to address the increased demand for bandwidth is reliance on functionalities for direct UE to UE communication (which may also be referred to as device-to-device (D2D) or sidelink communication), which allows two nearby devices (e.g., UEs) to communicate with each other in the cellular bandwidth without base station involvement or with limited base station involvement. However, introduction of D2D poses new challenges.

For example, to receive sidelink packets, a receiver UE ("Rx UE") generally performs blind decoding of all sidelink sub-channels. And while the current implementations of NR sidelink has focused on cellular vehicle-to-everything (C-V2X) technology where the number of sub-channels is typically small (e.g., 27 sub-channels), the same is not true for all applications of sidelink communications (e.g., internet of thing (IoT) devices).

Indeed, in IoT applications for instance, sidelink communications can be enabled between direct programmable logic controller (PLC) and a host of sensors/actuators (SAs). For example, a single PLC may control 20-50 SAs located on a robotic arm used for manufacturing. Because of the implementation of IoT applications, there may be tight latency (e.g., 1-2 milliseconds) and ultra-reliability requirements (e.g., $10^{-6}$ error rate) for communications between the PLC and the plurality of SAs. Thus, where the PLC is controlling the robotic arm that has 20-50 SAs, even a minor delay in communication may have adverse consequences (e.g., a weld being placed in the wrong location). As such, coordinating communication between the PLC and the SAs through a base station (gNB) may require multiple over-the-air (OTA) transmissions and adversely impact the latency and reliability.

IoT traffic may also have smaller packet size (e.g., 32-256 bytes) compared to other communications (e.g., cellular). Thus, the overall bandwidth requirement for IoT may be low (e.g., two resource blocks might be sufficient for many communications). However, SAs may also have constraints on UE capabilities in terms of bandwidth and processing power compared to typical UEs (e.g., smart phones). This is because unlike smart phones, SAs are typically affixed to controlled devices (e.g., robotic arm in above example) and do not require the full capabilities such as user interface, enhanced memory, and processing power due to the limited utilization of the SAs. And while each packet transmitted in IoT may individually be small in size (e.g., 32-256 bytes), the overall bandwidth may be large for IoT with dedicated frequency bands because of the high number of SAs (e.g., 20-50 SAs) that may be controlled by a single controlled PLC. For at least the foregoing reasons, communications for IoT devices (e.g., between PLC and plurality of SAs) may benefit from sidelink communication as opposed to being controlled via a base station that schedules resources between the PLC and the SAs. Similarly, other applications other than IoT may also have such low latency requirements that would benefit from sidelink communication.

However, as noted above, in contrast to C-V2X, many applications for sidelink communication such as IoT have significant number of sub-channels (e.g., 50-100 for IoT). Blind decoding all the sub-channels, as is conducted in conventional sidelink communications applications (e.g., C-V2X), may exceed UE capabilities and adversely impact the latency and reliability constraints of both the PLC and/or the SAs.

Techniques for configuring a search space for sidelink communications between one or more SAs and PLC in IoT applications in both "forward sidelink" and "reverse sidelink" have been developed that allow one or both of SAs and PLC to limit the number of subchannels that each device (e.g., SA or PLC) has to blindly decode for sidelink packets. For reference, "reverse sidelink communication" may refer to communication from the one or more SAs (e.g., a plurality of first UEs) to the PLC (e.g., a second UE). Conversely, "forward sidelink communication" may refer to communication from the PLC (e.g., a first UE) to the one or more SAs (e.g., a plurality of second UEs).

The term "search space" may correspond to a set of control channel elements (CCEs) that constitute a control or data region for the one or more UEs that may be allocated. Simply stated, a search space is a location in resource blocks where the receiver UE may search for PSCCH and/or PSSCH (e.g., data packet). The CCE indices in a given configurable control resource set (CORESET) for the PSCCH may be calculated based on a hashing functions such as:

$$L \cdot \left\{ \left( Y_{p,n_{s,f}^\mu}^\mu + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p} / L \rfloor \right\} + i \quad \text{Equation 1}$$

Thus, the current techniques configure a search space (e.g., subset of all available sub-channels) based on a hashing function (e.g., equation 1 as one example) that may utilize input parameters such as the first UE's identification ("SL-Rx-UE ID"), a second UE's identification ("SL-Tx-UE ID"), or a link identification between the first UE and the second UE ("SL-Tx-Rx-Link ID") to select positions within the sidelink resource pool for monitoring the physical sidelink control channel (PSCCH) and physical sidelink shared channels (PSSCH). Identifying search spaces within the sidelink resource pool might limit the number of subchannels that a receiver UE may need to decode from all available subchannels for sidelink communications, and thus conserve processing capacity.

However, sidelink resource pool typically includes all available resources from the network that may be allocated for sidelink communications. Indeed, within the network, a host of PLCs may be in communication with the network via a base station. The sidelink resource pool may be shared collectively with all the PLCs that are in communication with the base station. Each of the PLCs may further form a collection of subnetworks (or "PLC group") with the one or more SAs. Specifically, each of the one or more SAs would typically only communicate with a single PLC within a subnetwork. Therefore, configuring a search space that is based on the sidelink resource pool may still identify positions outside the resources that are specifically allocated for the PLC (e.g., PLC resource pool) associated with the one or more SAs.

Accordingly, aspects of the present disclosure provide techniques for configuring a search space design for each PLC group that improves on current system because the hashing function is based on the PLC's resource pool instead of the sidelink resource pool. As such, an Rx UE (e.g., SA in forward sidelink and/or PLC in reverse sidelink) may avoid wasting resources (e.g., processing power, battery utilization, bandwidth, etc.) for blind decoding subchannels that are not even allocated to the PLC.

By configuring resources specific to each PLC group, each PLC may manage the transmission and reception resources among the one or more SAs within each individual PLC group. Furthermore, the base station may be configured to perform inter-PLC coordination and dynamically allocate PLC resources between the plurality of PLCs by dividing and distributing the sidelink resource pool. It should be appreciated that the PLC resources (or PLC resource pool) do not necessarily need to be divided evenly amongst the plurality of PLCs, but may be adjusted disproportionately (e.g., first PLC receiving a larger share of the sidelink resource pool than the second PLC).

In some examples, the PLC may identify the number of resources that are used for its data exchange with the one or more SAs in accordance with the allocated PLC resource pool. To this end, in one aspect (e.g., mode 1), the base station may allocate a portion of the resources (PLC resources) from the sidelink resource pool to the PLC for sidelink communication within the PLC's subnetwork (or PLC group). In other words, the base station may allocate a subset of resources to the PLC from the sidelink resource pool that is available for a plurality of PLCs under the control of the base station.

Alternatively, in another example (e.g., mode 2), the PLC may autonomously select or reserve a portion of the resources from the sidelink resource pool for sidelink communication within the PLC's subnetwork (or PLC group). Stated differently, the PLC may select or reserve the portion of the resources for sidelink communications without awaiting an affirmative allocation of the PLC resources by the base station. Instead, the PLC may reserve the resources for a period of time by transmitting sidelink control information (SCI) message that sets the resource reservation period. In some examples, the PLC may also expand or decrease the amount of resources (e.g., slots/subchannels) that the PLC may autonomously reserve for sidelink communication with the one or more SAs without expressly being allocated such resources by the base station.

In either instance, whether the PLC resources are allocated by the base station (e.g., mode 1) or autonomously reserved by the PLC (e.g., mode 2), the PLC may split, configure, or utilize the resources between forward sidelink or reverse sidelink communication at the discretion of the PLC depending on the traffic requirements within each PLC subnetwork.

Once a portion of the resources (PLC resources) from the sidelink resource pool have been allocated or reserved for sidelink communication within the PLC subnetwork (or PLC group), the PLC may notify the one or more SAs within the PLC subnetwork (e.g., the one or more SAs that are associated with the PLC) of the allocation/reservation. The PLC may also indicate to the one or more SAs whether any portions of the PLC resources are to be used for forward and/or reverse sidelink communications. Accordingly, the PLC may inform the one or more SAs whether any portion of the PLC resources are being further reserved for forward and/or reverse sidelink communications in either separate and/or single signaling.

In some aspects, a separate resource indication message for separate resource pool may be transmitted. For example, if SA decodes the resource indication message from resource pool X, the PLC resource portion within the sidelink resource pool may refer to the resource pool X. In other examples, a resource pool index may be provided for each resource indication (e.g., time domain resource assignment (TDRA)/frequency domain resource assignment (FDRA) for each resource pool). More specifically, the PLC may inform the one or more SAs of the resources (PLC resources) from the sidelink resource pool that have been allocated or reserved for sidelink communication within the PLC subnetwork (or PLC group) by one of multitude of options.

First, the PLC may inform the one or more SAs of the PLC resources using PSSCH and broadcast this information to all the SAs (e.g., UEs) that are associated with the PLC. The SAs decoding the PSSCH would thereby recognize that PLC resources identified in the PSSCH broadcast message are reserved for the PLC subnetwork. Accordingly, the SAs may adapt the search space hashing function such that the search space is configured in accordance with the portion of the resources (PLC resources) from the sidelink resource pool that have been allocated or reserved for sidelink communication within the PLC subnetwork (or PLC group) as opposed to the sidelink resource pool itself. By doing so, the one or more SAs may reduce the number of subchannels that may be required to be decoded for sidelink communications even further than current solutions that rely on search spaces that are based on configuring search spaces based on the entire sidelink resource pool that may be available for all the PLCs within the network.

Second, the PLC may identify the PLC resources to the one or more SAs in "SCI 1" message with a special "SCI 2" format that is transmitted to the one or more SAs. Specifically, in some examples, the FDRA/TDRA and resource reservation period within the "SCI 1" may be utilized to identify the portion of the resources (PLC resources) from the sidelink resource pool that have been allocated or reserved for sidelink communication for the PLC subnetwork (or PLC group). Additionally, a special "SCI 2" format may be used within the "SCI 1" to instruct the one or more SAs that "SCI 2" is contained in X subchannels starting from the subchannels containing SCI 1 (e.g., X may be 1 or 2 depending on size of SCI 2 or can be RRC configured). In turn, the SCI 2 may contain the FDRA/TDRA for the PSSCH. Optionally, a cyclic redundancy check (CRC) of SCI 2 may be scrambled by the source identification (ID) and group destination ID in order prevent the SAs that are outside the PLC group (e.g., SAs associated another subnetwork) from reading the SCI 2 transmitted by the PLC such that each PLC group may maintain separation for the resources that are reserved or allocated for each PLC group accordingly.

Third, the PLC may indicate the portion of the resources (PLC resources) from the sidelink resource pool that have been allocated or reserved for sidelink communication for the PLC subnetwork (or PLC group) in the SCI 2 format. Specifically, a SCI 2 format containing resource indication fields (e.g., TDRA, FDRA, reservation period, resource pool index) may be generated that identifies the PLC resources to the one or more SAs. The CRC of a SCI 2 may again be scrambled by a special sequence (e.g., source ID and group destination ID). In some instances, certain fields within the SCI 2 such as source ID and/or destination ID may be re-interpreted to indicate resource indication.

In some examples, the SA may confirm the portion of the resources (PLC resources) from the sidelink resource pool that have been allocated or reserved for sidelink communication for the PLC subnetwork (or PLC group) for data transmission in the network in configuring the search space. In some instances, with respect to configuring the search space based on a hashing function, if seed/ID is configured by PLC, the SA may use the configured seed/ID to determine search monitoring PSCCH. However, if the seed/ID is not configured by PLC, the SA may then use the sidelink ID to determine the search space monitoring PSCCH. In some instances, the SA may be configured by the PLC with multiple search spaces of different types (e.g., common search space, common-group search space, user-specific search space, etc.), each with different monitoring occasions (e.g., periodicity). Additionally, the hashing functions may be within the resources configured by the PLC.

Thus, in some examples, the search space design may be based on portion of the resources (PLC resources) from the sidelink resource pool where the positions outside the identified PLC will no longer be monitored. Specifically, in such scenarios, the SA may ignore or omit decoding the subchannels that fall outside the PLC resources for forward sidelink communication. Similarly, with respect to reverse sidelink communication, the search space may be configured such that the PLC may limit the decoding of the subchannels to positions that fall within the PLC resources and omit any subchannels or positions that are identified by the hashing function outside of the PLC resources. In another example, the search space hashing function may be based only on the resources identified within the PLC resources.

It should be appreciated that the search space design may apply equally to both the forward and reverse sidelink communications. Thus, the configuration of search space may be adapted by either the SAs or PLC as discussed herein. For example, in some examples, the PLC may configure a search space (e.g., subset of all available subchannels) for reception of sidelink packets (e.g., PSCCH and PSSCH) that may be received at the PLC from the one or more SAs. In some examples, the PLC may monitor the subset of subchannels and decode the sidelink packets received on the subset of subchannels without the need for the PLC to perform blind decoding of all sidelink subchannel s.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 514 and a sidelink communication management component 450 (see FIG. 4) for management of resources for search space configuration in sidelink communications between a plurality of UEs. In some aspects, the UE 104 may function as PLC or SA in an IoT application. More specifically, the sidelink communication management component 450 may configure a search space for sidelink communications between one or more SAs and PLC based on a hashing function that is based in part on a portion of the resources (e.g., PLC resources) that have been allocated or reserved within the PLC subnetwork (or PLC group) from the sidelink resource pool available to a plurality of PLCs in a network as opposed to a search space that is calculated based on a larger sidelink resource pool. By limiting the search space to a subset of resources that are specific to the PLC subnetwork or group, the need for the SA or PLC to perform blind decoding of sidelink sub-channels may be further reduced, thereby maximizing hardware resources (e.g., by using less processing power and bandwidth) for sidelink communications.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
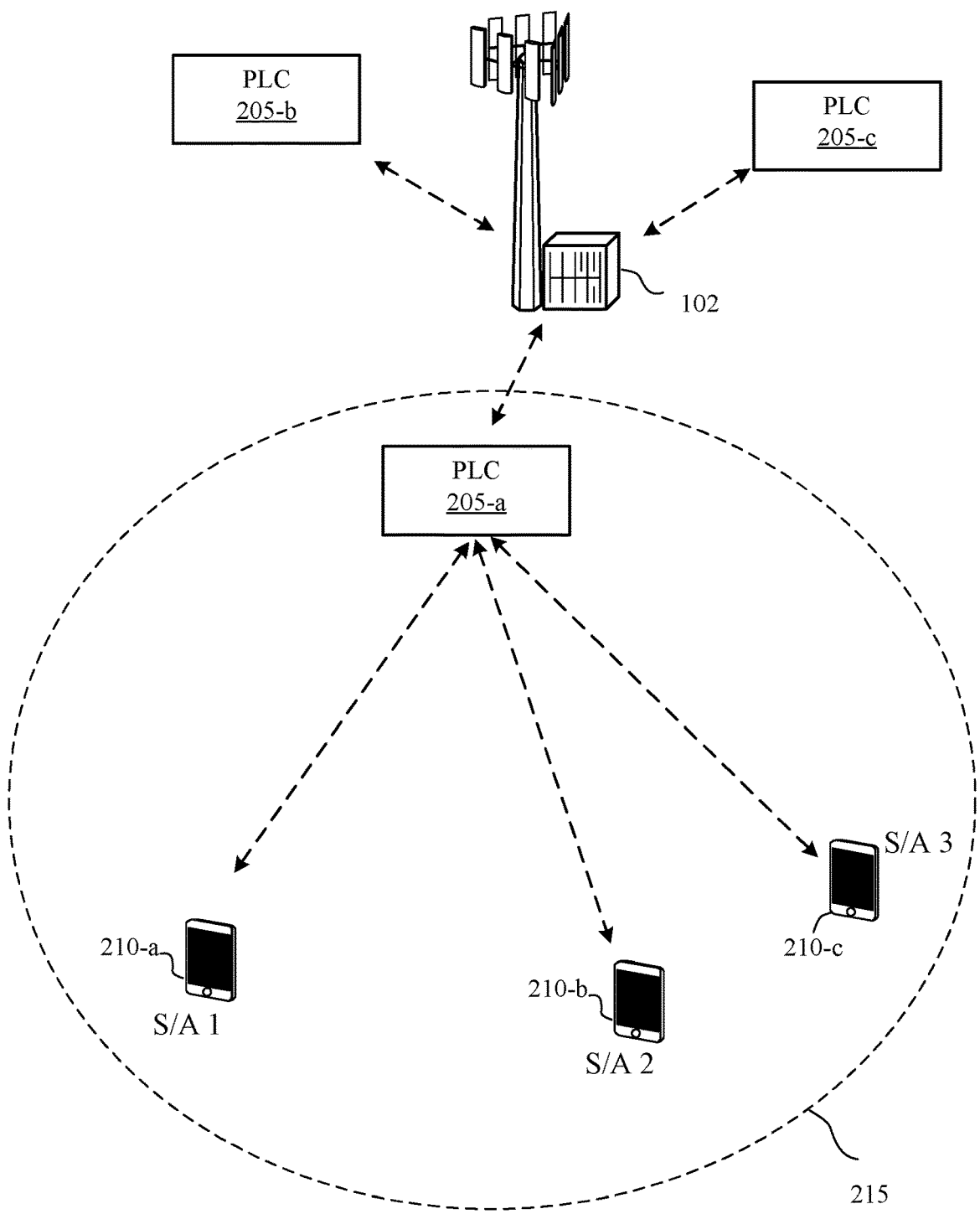
FIG. 2 is a schematic diagram of an example of a wireless communication system implementing sidelink communication in IoT applications accordance with aspects of the present disclosure.

FIG. 2 is a schematic diagram 200 of an example of a wireless communication system implementing sidelink communication in IoT applications in accordance with aspects of the present disclosure. The schematic diagram 200 illustrates an example of base station 102 in communication with one or more PLCs 205 (e.g., first PLC 205-*a*, second PLC 205-*b*, third PLC 205-*c*). The base station 102 may share a sidelink resource pool with the plurality of PLCs 205. Each of the PLCs 205 may further form a collection of subnetworks (or "PLC group") 215 with the one or more SAs 210 (e.g., first S/A 210-*a*, second S/A 210-*b*, and third S/A 210-*c*). Specifically, each of the one or more SAs 210 may typically communicate with a single PLC 205 within a subnetwork or PLC group 215.

As noted above, in the IoT applications for instance, sidelink communications can be enabled between direct PLC 205 and a host of sensors/actuators 210 (also referred hereto as UEs 104). In some examples, the UEs 104 operating as sensors/actuators may be reduced capability UEs 104 than traditional smart phones or may be configured with hardware specific for various applications (e.g., additional sensors etc.) A single PLC 205 may control 20-50 SAs. Because of the implementation of IoT applications, there may be tight latency (e.g., 1-2 milliseconds) and ultra-reliability requirements (e.g., $10^{-6}$ error rate) for communications between the PLC 205 and the plurality of SAs 210.

In some aspects, IoT traffic may be smaller packet size (e.g., 32-256 bytes) compared to other communications (e.g., cellular). Thus, the overall bandwidth requirement for IoT may be low (e.g., two resource blocks might be sufficient for many communications). Additionally, applications for sidelink communication in IoT application may have significant number of sub-channels (e.g., 50-100) in comparison to, for example, C-V2X applications. Thus, blind decoding all the sub-channels, as is conducted in conventional sidelink communications for applications such as C-V2X, may exceed UE capabilities and adversely impact the latency and reliability constraints.

To this end, aspects of the present disclosure may configure a search space for sidelink communications between a plurality of UEs 104. For purposes of the present disclosure, it should be appreciated that UE 104 may broadly encompass both the PLC 205 and the SAs 210 that may be reduced or specially configured capability UEs 104 (e.g., configured with specific hardware such as sensors and actuators).

Specifically, as with the SAs 210, the PLCs 205 may receive reverse sidelink communications from a plurality of SAs 210 (e.g., 50-60 SAs) that are associated with a single PLC 205, decoding all the subchannels for sidelink traffic from each of the SAs 210 may be resource intensive for the PLC 205 in terms of processing power.

Thus, in some aspects, the PLC 205 may also configure a search space for reverse sidelink communications from the one or more SAs 210 to the PLC 205 in IoT applications. The techniques described herein configure a search space (e.g., subset of all available sub-channels) to decode the sidelink packets (e.g., PSCCH and/or PSSCH) transmitted between a first UE (e.g., PLC 205 or SA 210) and a second UE (e.g., SA 210 or PLC 205) over sidelink communication without the need for the receiver UE (e.g., either PLC or SA) to perform blind decoding of all sidelink sub-channels as is currently required in conventional systems. Thus, the disclosed techniques reduce latency and maximize the resource utilization (e.g., by using less processing power and bandwidth) for sidelink communications.

In either forward or reverse sidelink communication, search spaces (e.g., subset of all available sub-channels) are generally based on a hashing function that may utilize input parameters such as the first UE's identification ("SL-Rx-UE ID"), a second UE's identification ("SL-Tx-UE ID"), or a link identification between the first UE and the second UE ("SL-Tx-Rx-Link ID") to select positions within the sidelink resource pool for monitoring the PSCCH and PSSCH. And as noted above, identifying search spaces within the sidelink resource pool might limit the number of subchannels that a receiver UE 104 (PLC 205 and/or SA 210) may need to decode from all available subchannels for sidelink communications, and thus conserve processing capacity.

However, sidelink resource pool typically includes all available resources from the network that may be allocated for sidelink communications. Indeed, within the network, a host of PLCs 205 may be in communication with the network via a base station 102. The sidelink resource pool may be shared collectively with multiple PLCs 205 that are in communication with the base station 102. Each of the PLCs 205 may further form a collection of subnetworks (or "PLC group") 215 with the one or more SAs 210. Therefore, configuring a search space that is based on the sidelink resource pool that is available to a plurality of PLCs 205 outside of the subnetwork 215 may identify positions for the UE 104 to monitor for PSCCH that fall outside the resources that are specifically allocated for the PLC 205 (e.g., PLC resource pool) associated with the one or more SAs 210.

Accordingly, aspects of the present disclosure provide techniques for configuring a search space design for each PLC group 215 that improves on current system because the hashing function is based on the resource pool that is allocated to the PLC 205 instead of the sidelink resource pool that is available to the entire network (and thus to multiple PLCs collectively). As such, an Rx UE (e.g., SA 210 in forward sidelink and/or PLC 205 in reverse sidelink) may avoid wasting resources (e.g., processing power, battery utilization, bandwidth, etc.) for blind decoding subchannels that are not even allocated to the PLC 205.

By configuring resources specific to each PLC group 215, each PLC 205 may manage the transmission and reception resources among the one or more SAs 210 within each individual PLC group 215. Furthermore, the base station 102 may be configured to perform inter-PLC coordination and dynamically allocate PLC resources between the plurality of PLCs by dividing and distributing the sidelink resource pool.

In some examples, the PLC 205 may identify the number of resources that are used for its data exchange with the one or more SAs 210 in accordance with the allocated PLC resource pool. To this end, in one aspect (e.g., mode 1), the base station 102 may allocate a portion of the resources (PLC resources) from the sidelink resource pool to the PLC 205 for sidelink communication within the PLC's subnetwork (or PLC group) 215. Alternatively, in another example (e.g., mode 2), the PLC 205 may autonomously select or reserve a portion of the resources from the sidelink resource pool for sidelink communication within the PLC's subnetwork (or PLC group) 215. Stated differently, the PLC 205 may select or reserve the portion of the resources for sidelink communications without awaiting an affirmative allocation of the PLC resources by the base station 102. Instead, the PLC may reserve the resources for a period of time by transmitting sidelink control information (SCI) message that sets the resource reservation period. In some examples, the PLC 205 may also expand or decrease the amount of resources (e.g., slots/subchannels) that the PLC 205 may autonomously reserve for sidelink communication with the one or more SAs without expressly being allocated such resources by the base station.

In either instance, whether the PLC resources are allocated by the base station 102 (e.g., mode 1) or autonomously reserved by the PLC 205 (e.g., mode 2), the PLC 205 may split, configure, or utilize the resources between forward sidelink or reverse sidelink communication at the discretion of the PLC 205 depending on the traffic requirements within each PLC subnetwork 215.

Once a portion of the resources (PLC resources) from the sidelink resource pool have been allocated or reserved for sidelink communication within the PLC subnetwork (or PLC group) 215, the PLC 205 may notify the one or more SAs 210 within the PLC subnetwork 215 (e.g., the one or more SAs that are associated with the PLC) of the allocation/reservation. The PLC 205 may also indicate to the one or more SAs 210 whether any portions of the PLC resources are to be used for forward and/or reverse sidelink communications. Accordingly, the PLC 205 may inform the one or more SAs 104 whether any portion of the PLC resources are being further reserved for forward and/or reverse sidelink communications in either separate and/or single signaling.

In some aspects, a separate resource indication message for separate resource pool may be transmitted. For example, if SA 210 decodes the resource indication message from resource pool X, the PLC resource portion within the sidelink resource pool may refer to the resource pool X. In other examples, a resource pool index may be provided for each resource indication (e.g., TDRA/FDRA for each resource pool). More specifically, the PLC 205 may inform the one or more SAs of the resources (PLC resources) from the sidelink resource pool that have been allocated or reserved for sidelink communication within the PLC subnetwork (or PLC group) 215 by one of multitude of options.

First, the PLC 205 may inform the one or more SAs 210 of the PLC resources using PSSCH and broadcast this information to all the SAs (e.g., UEs) that are associated with the PLC 205. The SAs 210 decoding the PSSCH would thereby recognize that PLC resources identified in the PSSCH broadcast message are reserved for the PLC subnetwork 215. Accordingly, the SAs 210 may adapt the search space hashing function such that the search space is configured in accordance with the portion of the resources (PLC resources) from the sidelink resource pool that have been allocated or reserved for sidelink communication within the PLC subnetwork (or PLC group) as opposed to the sidelink resource pool itself. By doing so, the one or more SAs 210 may reduce the number of subchannels that may be required to be decoded for sidelink communications even further than current solutions that rely on search spaces that are based on configuring search spaces based on the entire sidelink resource pool that may be available for all the PLCs within the network.

Second, the PLC 205 may identify the PLC resources to the one or more SAs 210 in "SCI 1" message with a special "SCI 2" format that is transmitted to the one or more SAs. Specifically, in some examples, the FDRA/TDRA and resource reservation period within the "SCI 1" may be utilized to identify the portion of the resources (PLC resources) from the sidelink resource pool that have been allocated or reserved for sidelink communication for the PLC subnetwork (or PLC group). Additionally, a special "SCI 2" format may be used within the "SCI 1" to instruct the one or more SAs that "SCI 2" is contained in X subchannels starting from the subchannels containing SCI 1 (e.g., X may be 1 or 2 depending on size of SCI 2 or can be RRC configured). In turn, the SCI 2 may contain the FDRA/TDRA for the PSSCH. Optionally, a cyclic redundancy check (CRC) of SCI 2 may be scrambled by the source identification (ID) and group destination ID in order prevent the SAs that are outside the PLC group (e.g., SAs associated another subnetwork) from reading the SCI 2 transmitted by the PLC such that each PLC group may maintain separation for the resources that are reserved or allocated for each PLC group accordingly.

Third, the PLC 205 may indicate the portion of the resources (PLC resources) from the sidelink resource pool that have been allocated or reserved for sidelink communication for the PLC subnetwork (or PLC group) in the SCI 2 format. Specifically, a SCI 2 format containing resource indication fields (e.g., TDRA, FDRA, reservation period, resource pool index) may be generated that identifies the PLC resources to the one or more SAs. The CRC of a SCI 2 may again be scrambled by a special sequence (e.g., source ID and group destination ID). In some instances, certain fields within the SCI 2 such as source ID and/or destination ID may be re-interpreted to indicate resource indication.

Figure 3A:
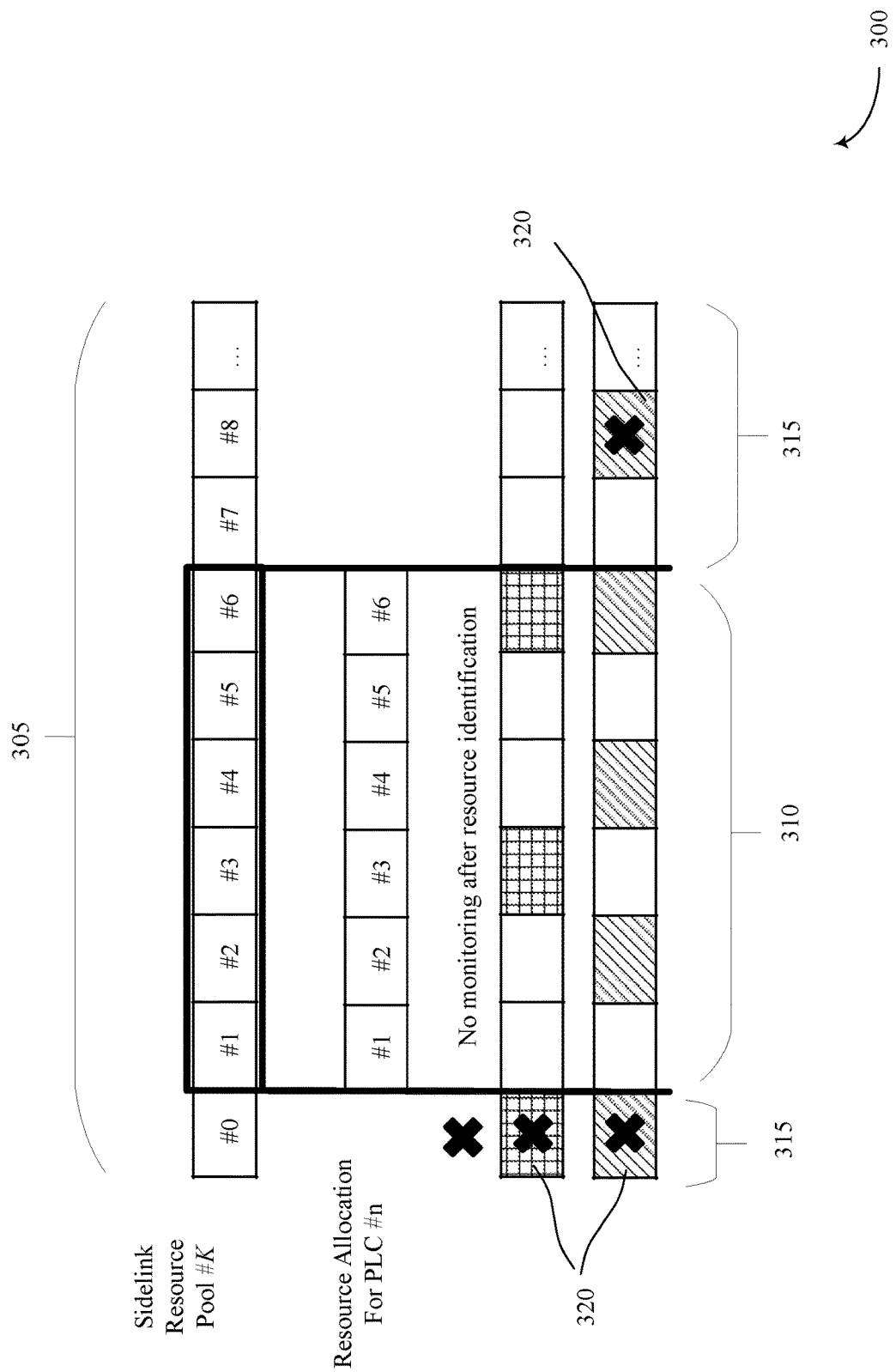
FIG. 3A is a diagram of search space design for monitoring sidelink communications based on resource allocations in accordance with various aspects of the present disclosure.

FIG. 3A is a diagram 300 of search space design for monitoring sidelink communications. As discussed above, one or more PLCs may be allocated resources 310 (e.g., PLC resources) from a sidelink resource pool 305. The PLC resources 305 may be a subset of all available sidelink resource pool 305. Because of the allocation of PLC resources 305, the SA, in such a scenario, may ignore or omit monitoring and decoding the subchannels 315 that fall outside the PLC resources 310 for forward sidelink communication (e.g., omitting subchannel nos. 0 and 8 (320) in illustrated example that fall outside the portion of resource allocated to PLC). Similarly, with respect to reverse sidelink communication, the search space may be configured such that the PLC may limit the decoding of the subchannels to positions that fall within the PLC resources 310 and omit any subchannels or positions that are identified by the hashing function outside of the PLC resources (e.g., subchannels 315).

Figure 3B:
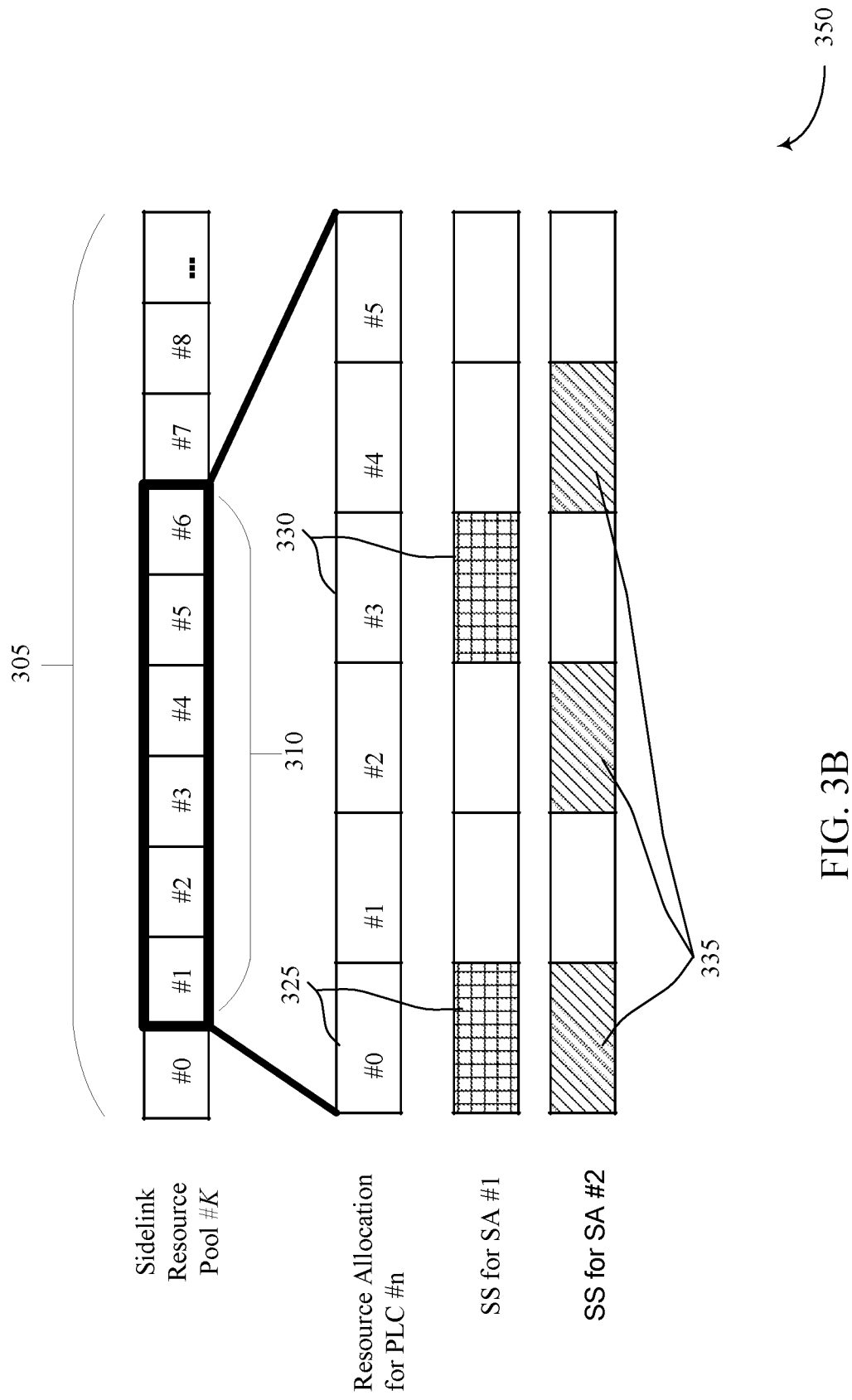
FIG. 3B is a diagram of another search space design for monitoring sidelink communications based on resource allocations in accordance with various aspects of the present disclosure.

FIG. 3B is a diagram 350 of another search space design for monitoring sidelink communications where the search space hashing function may be based on the resources identified within the PLC resources 310. In such scenario, once the portion of the sidelink resource pool 305 that is allocated for the PLC is identified (e.g., Pool Nos. 1-6, collectively 310), the hashing function may identify the search spaces associated with the SAs that fall within the PLC resources 310. For example, with respect to the first SA (SA 1), the search spaces for monitoring for PSCCH may be limited to PLC resource no 0 325 (that corresponds to sidelink resource pool No. 1) and PLC resource no. 3 (330). Similarly, for second SA (SA 2), the search spaces for monitoring for PSCCH may be limited to PLC resource Nos. 0, 2, and 4 (334) that also fall within the portion of resources allocated 310 to the PLC 205.

Figure 4:
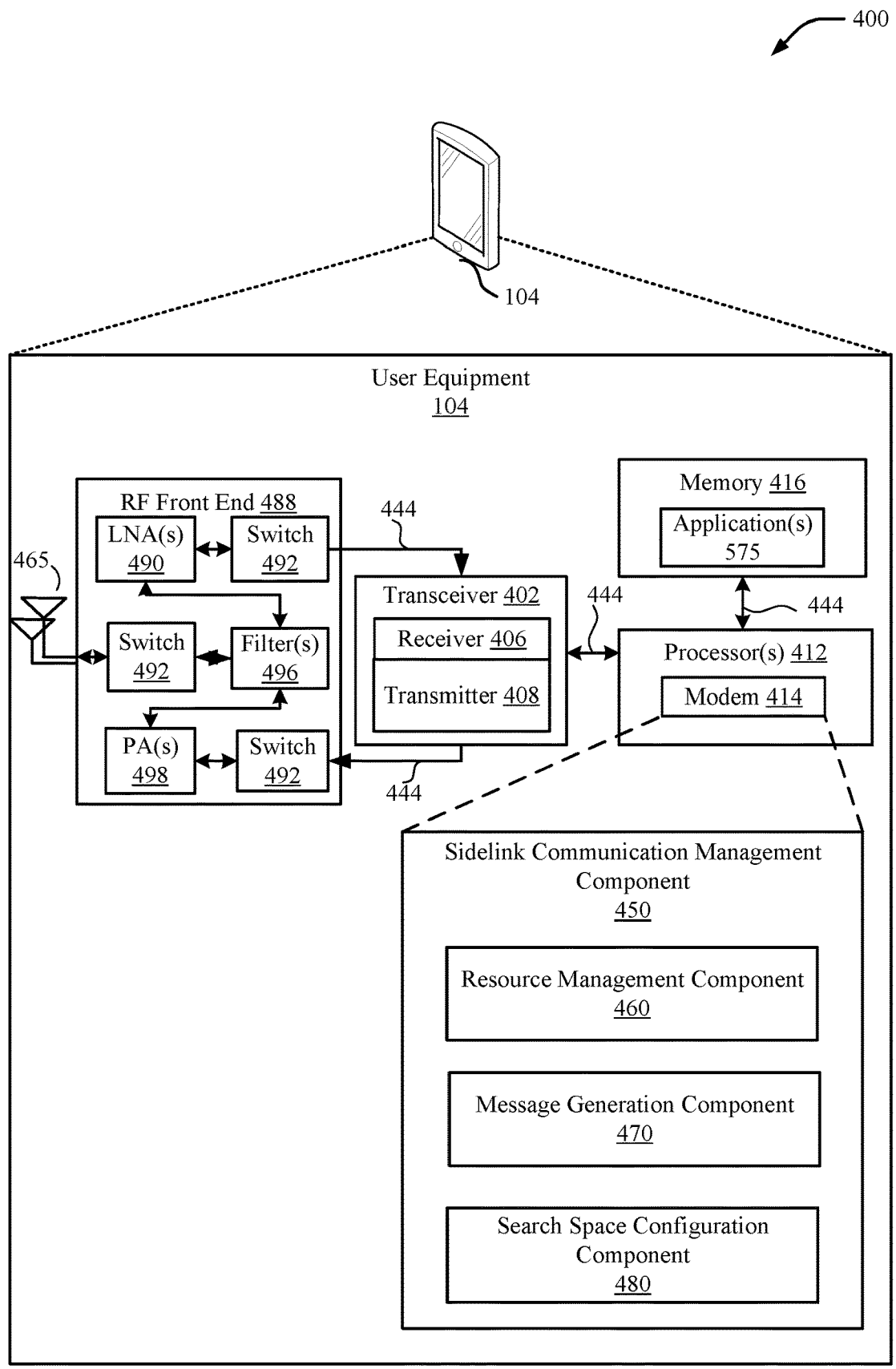
FIG. 4 is a schematic diagram of an example implementation of various components of a user equipment in accordance with various aspects of the present disclosure.

FIG. 4 illustrates a hardware components and subcomponents of a device that may be a UE 104 for implementing one or more methods (e.g., method 500) described herein in accordance with various aspects of the present disclosure. For example, one example of an implementation of the UE 104 may include a variety of components, some of which have already been described above, but including components such as one or more processors 412, memory 416 and transceiver 402 in communication via one or more buses 444, which may operate in conjunction with the sidelink communication management component 450 to perform functions described herein related to including one or more methods (e.g., 400) of the present disclosure.

In some aspects, the sidelink communication management component 450 may manage resources and configure monitor a search space for sidelink communications between a plurality of UEs. More specifically, the sidelink communication management component 450 may configure a search space for sidelink communications between one or more SAs and PLC based on a hashing function that is based in part on a portion of the resources (e.g., PLC resources) that have been allocated or reserved within the PLC subnetwork (or PLC group) from the sidelink resource pool available to a plurality of PLCs in a network as opposed to a search space that is calculated based on a larger sidelink resource pool. By limiting the search space to a subset of resources that are specific to the PLC subnetwork or group, the need for the SA or PLC to perform blind decoding of sidelink sub-channels may be further reduced, thereby maximizing hardware resources (e.g., by using less processing power and bandwidth) for sidelink communications.

The sidelink communication management component 450 may further include resource management component 460 for processing the resource allocations by the base station. Specifically, resource management component 460 may be configured to receive resource allocation messages from the base station that allocates a portion of the resources (PLC resources) from the sidelink resource pool to the PLC for sidelink communication within the PLC's subnetwork (or PLC group). The resource management component 460 may also may select or reserve the portion of the resources for sidelink communications without awaiting an affirmative allocation of the PLC resources by the base station. Instead, the PLC may reserve the resources for a period of time by transmitting SCI message that sets the resource reservation period. The resource management component 460 may further split, configure, or utilize the resources between forward sidelink or reverse sidelink communication depending on the traffic requirements within each PLC subnetwork.

The sidelink communication management component 450 may further include message generation component 470 for notifying the one or more SAs within the PLC subnetwork (e.g., the one or more SAs that are associated with the PLC) of the allocation/reservation once a portion of the resources (PLC resources) from the sidelink resource pool have been allocated or reserved for sidelink communication. In some examples, the message generation component 470 may inform the one or more SAs of the PLC resources using PSSCH and broadcast this information to all the SAs (e.g., UEs) that are associated with the PLC. In other examples, the message generation component 470 may identify the PLC resources to the one or more SAs in "SCI 1" message with a special "SCI 2" format that is transmitted to the one or more SAs. In yet another example, the message generation component 470 may indicate the portion of the resources (PLC resources) from the sidelink resource pool that have been allocated or reserved for sidelink communication for the PLC subnetwork (or PLC group) in the SCI 2 format.

The sidelink communication management component 450 may further include search space configuration component 480 that may modify the search space configuration based on portion of the resources (PLC resources) from the sidelink resource pool where the monitoring positions for PSCCH that fall outside the identified PLC resources may be ignored or omitted from monitoring. In other examples, the search space configuration component 480 may modify search space hashing function to be limited to only the resources that identified within the PLC resources for sidelink communications.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to sidelink communication management component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with sidelink communication management component 450 may be performed by transceiver 402.

The memory 416 may be configured to store data used herein and/or local versions of application(s) 475 or sidelink communication management component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining sidelink communication management component 450 and/or one or more of its subcomponents, and/or data associated therewith, when the UE 104 is operating at least one processor 412 to execute sidelink communication management component 450 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 306 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 488, which may operate in communication with one or more antennas 465 and transceiver 402 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 388 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device can communicate with, for example, one or more base stations 102 or one or more cells associated with one or more base stations 102 or other UEs 104. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

Figure 5:
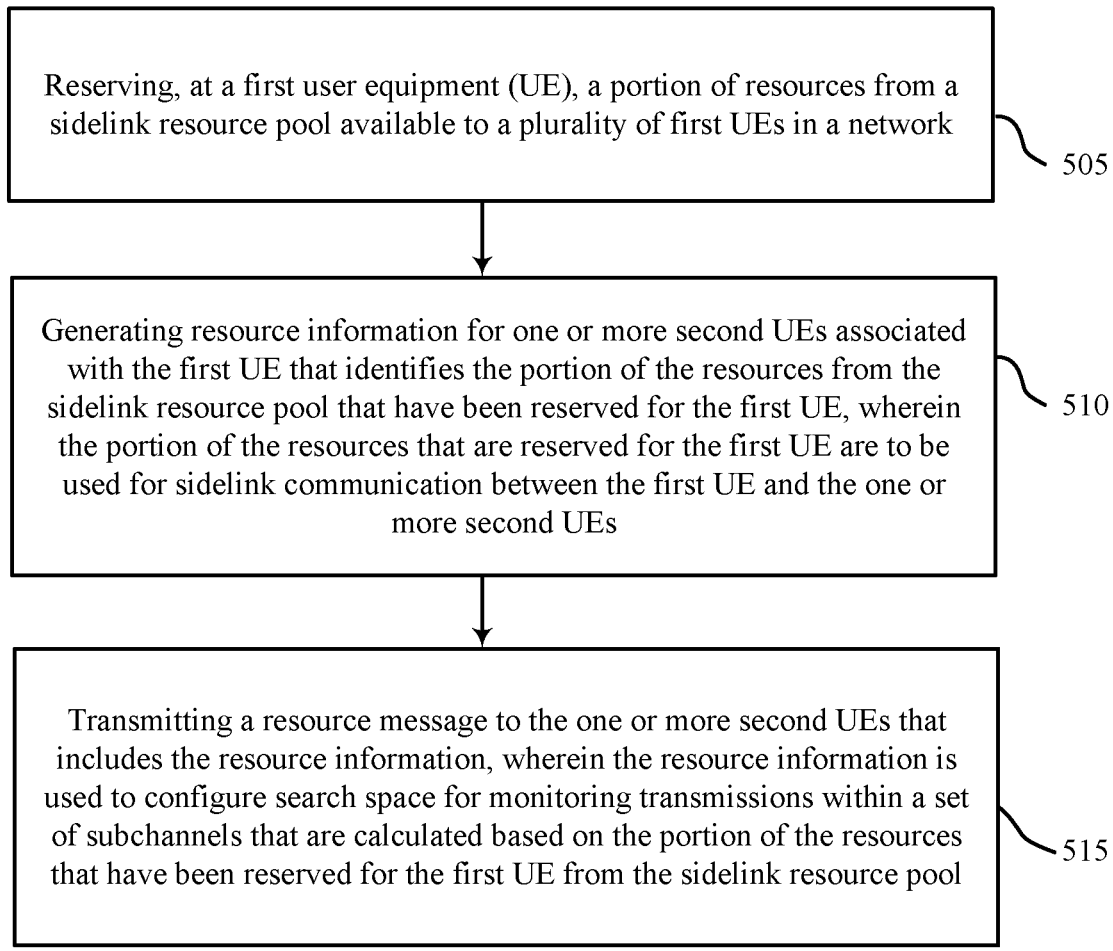
FIG. 5 is a flow diagram of an example of a method of wireless communication implemented by the UE such as a PLC in accordance with aspects of the present disclosure.

Referring to FIG. 5, an example method 500 for wireless communications in accordance with aspects of the present disclosure may be performed by one or more UEs 104 (e.g., PLC) discussed with reference to FIGS. 1, 2A, and 2B. Although the method 500 is described below with respect to the elements of the UE 104, other components may be used to implement one or more of the steps described herein.

At block 505, the method 500 may include reserving, at a first UE, a portion of resources from a sidelink resource pool available to a plurality of first UEs in a network. In some aspects, reserving the portion of the resources may include receiving, from a base station, the allocation of the portion of the resource from the sidelink resource pool. In other examples, reserving the portion of the resources may include selecting, at the first UE, the portion of the resource from the sidelink resource pool by identifying a resource reservation period, and transmitting a sidelink control information (SCI) that identifies the portion of the resource from the sidelink resource pool that are being reserved by the first UE and a resource reservation period. In other words, the allocation of a portion of resources from a sidelink resource pool may be either expressly allocated by the base station or selected/reserved by the first UE on its own. Aspects of block 505 may be performed by the transceiver 402, sidelink communication management component 450, resource management component 460 as described with reference to FIG. 4. Thus, transceiver 402, sidelink communication management component 450, resource management component 460, modem 414, processor 412, and/or the UE 104 or one of its subcomponents may define the means for receiving, at a first UE, an allocation of a portion of resources from a sidelink resource pool available to a plurality of first UEs in a network.

At block 510, the method 500 may include generating resource information for one or more second UEs associated with the first UE that identifies the portion of the resources from the sidelink resource pool that have been reserved for the first UE. The portion of the resources that are reserved for the first UE may be used for sidelink communication between the first UE and the one or more second UEs. In some examples, generating resource information may include allocating a forward sidelink communication resources within the portion of resources that are reserved for the first UE, and allocating a reverse sidelink communication resources within the portion of resources that are reserved for the first UE. The method may further include generating resource information that includes information about one or both of the forward sidelink communication resources and the reverse sidelink communication resources.

Aspects of block 510 may be performed by the transceiver 402, sidelink communication management component 450, resource management component 460 as described with reference to FIG. 4. Thus, sidelink communication management component 450, message generation component 470, modem 414, processor 412, and/or the UE 104 or one of its subcomponents may define the means for generating resource information for one or more second UEs associated with the first UE that identifies the portion of the resources from the sidelink resource pool that have been allocated to the first UE.

At block 515, the method 500 may include transmitting a resource message to the one or more second UEs that includes the resource information. The resource information may be used to configure search space for monitoring transmissions within a set of subchannels that are calculated based on the portion of the resources that have been reserved for the first UE from the sidelink resource pool. In some examples, transmitting a resource message to the one or more second UEs may include transmitting a first resource message to the one or more second UE regarding the forward sidelink communication resources, and transmitting a second resource message to the one or more second UE regarding the forward sidelink communication resources. In other examples, transmitting a resource message to the one or more second UEs may include transmitting the resource message to the one or more second UEs that includes the resource information regarding both forward sidelink communication resources and reverse sidelink communication resources.

In some aspects, transmitting the resource message may include transmitting a resource pool index identifying the portion of the resources that are reserved for the first UE to be used for sidelink communication between the first UE and the one or more second UEs. In other examples, the method may include transmitting the resource message in a physical sidelink shared channel (PSSCH) to the one more second UEs identifying the portion of the resources from the sidelink resource pool that have been reserved for the first UE. Additionally, the method may include transmitting one or more of time domain resource assignment (TDRA), frequency domain resource assignment (FDRA), resource reservation period association with the portion of the resources that are reserved for the first UE from the sidelink resource pool in a sidelink control information (SCI) message.

In some aspects, the search space for monitoring transmissions within the set of subchannels that are calculated based on the portion of the resources may include identifying a subset of the subchannels from the set of subchannels in the search space that fall outside of the portion of the resources that are reserved for the first UE, and omitting transmissions received in the identified subset of the subchannels. In other examples, the method may include determining the set of sub channels that are within the portion of the resources that have been reserved for the first UE from the sidelink resource pool, and monitoring sidelink communications in one or more of the set of subchannels.

Aspects of block 515 may be performed by the transceiver 402, sidelink communication management component 450, search space configuration component 480 as described with reference to FIG. 4. Thus, sidelink communication management component 450, message generation component 470, modem 414, processor 412, and/or the UE 104 or one of its subcomponents may define the means for transmitting a resource message to the one or more second UEs that includes the resource information.

Figure 6:
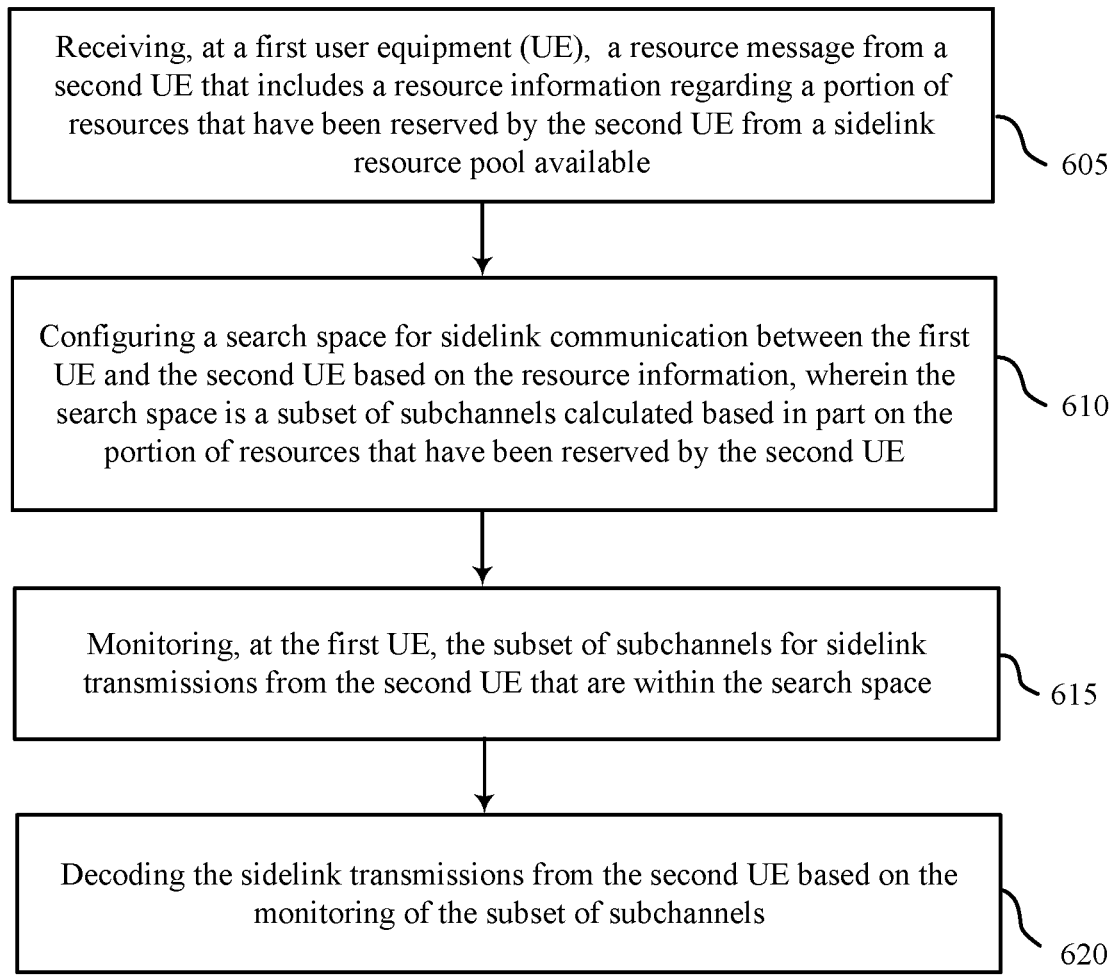
FIG. 6 is another flow diagram of an example of a method of wireless communication implemented by the UE in accordance with aspects of the present disclosure.

Referring to FIG. 6, an example method 600 for wireless communications in accordance with aspects of the present disclosure may be performed by one or more UEs 104 (e.g., S?A) discussed with reference to FIGS. 1, 2A, and 2B. Although the method 600 is described below with respect to the elements of the UE 104, other components may be used to implement one or more of the steps described herein.

At block 605, the method 600 may include receiving, at a first UE, a resource message from a second UE that includes a resource information regarding a portion of resources that have been reserved by the second UE from a sidelink resource pool available. In some examples, receiving the resource message may include receiving a sidelink control information (SCI) that identifies the portion of the resource from the sidelink resource pool that are being reserved by the second UE and a resource reservation period. In other examples, receiving the resource message may include receiving a first resource message regarding forward sidelink communication resources within the portion of resources that are reserved for the second UE, and receiving a second resource message regarding reverse sidelink communication resources that are reserved for the second UE.

In some examples, receiving the resource message may include receiving the resource message that includes the resource information regarding both a forward sidelink communication resources and a reverse sidelink communication resources that are reserved for the second UE. In other aspects, the method may include receiving a resource pool index identifying the portion of the resources that are reserved for the second UE to be used for sidelink communication between the first UE and the second UE. The method may also include receiving the resource message in a physical sidelink shared channel (PSSCH) to identifying the portion of the resources from the sidelink resource pool that have been reserved for the second UE. In some aspects, the method may include receiving one or more of time domain resource assignment (TDRA), frequency domain resource assignment (FDRA), resource reservation period association with the portion of the resources that are reserved for the second UE from the sidelink resource pool in a sidelink control information (SCI) message.

Aspects of block 605 may be performed by the transceiver 402, sidelink communication management component 450, and search space configuration component 480 as described with reference to FIG. 4. Thus, sidelink communication management component 450, transceiver, modem 414, processor 412, and/or the UE 104 or one of its subcomponents may define the means for receiving, at a first UE, a resource message from a second UE that includes a resource information regarding a portion of resources that have been reserved by the second UE from a sidelink resource pool available.

At block 610, the method 600 may include configuring a search space for sidelink communication between the first UE and the second UE based on the resource information. In some examples, the search space may be a subset of subchannels calculated based in part on the portion of resources that have been reserved by the second UE. The search space that is calculated may comprise identifying a subset of the subchannels from the set of subchannels in the search space that fall outside of the portion of the resources that are reserved for the second UE, and omitting transmissions received in the identified subset of the subchannels. In other examples, the search space may be calculated by determining the set of subchannels that are within the portion of the resources that have been reserved for the second UE from the sidelink resource pool, and monitoring sidelink communications in one or more of the set of subchannels.

Aspects of block 610 may be performed by the resource management component 460 and the search space configuration component 480 as described with reference to FIG. 4. Thus, sidelink communication management component 450, resource management component 460, search space configuration component 480, modem 414, processor 412, and/or the UE 104 or one of its subcomponents may define the means for configuring a search space for sidelink communication between the first UE and the second UE based on the resource information.

At block 615, the method 600 may include monitoring, at the first UE, the subset of subchannels for sidelink transmissions from the second UE that are within the search space. Aspects of block 610 may be performed by the search space configuration component 480 as described with reference to FIG. 4. Thus, sidelink communication management component 450, modem 414, processor 412, and/or the UE 104 or one of its subcomponents may define the means for monitoring, at the first UE, the subset of subchannels for sidelink transmissions from the second UE that are within the search space.

At block 620, the method 600 may include decoding the sidelink transmissions from the second UE based on the monitoring of the subset of subchannels. Aspects of block 610 may be performed by the search space configuration component 480 as described with reference to FIG. 4. Thus, sidelink communication management component 450, modem 414, processor 412, and/or the UE 104 or one of its subcomponents may define the means for decoding the sidelink transmissions from the second UE based on the monitoring of the subset of subchannels.

Some Further Example Clauses

Implementation examples are described in the following numbered clauses:
1. A method for wireless communications, comprising:
    reserving, at a first user equipment (UE), a portion of resources from a sidelink resource pool available to a plurality of first UEs in a network;
    generating resource information for one or more second UEs associated with the first UE that identifies the portion of the resources from the sidelink resource pool that have been reserved for the first UE, wherein the portion of the resources that are reserved for the first UE are to be used for sidelink communication between the first UE and the one or more second UEs; and
    transmitting a resource message to the one or more second UEs that includes the resource information, wherein the resource information is used to configure search space for monitoring transmissions within a set of subchannels that are calculated based on the portion of the resources that have been reserved for the first UE from the sidelink resource pool.
2. The method of clause 1, wherein reserving the portion of the resources from the sidelink resource pool available to the plurality of first UEs in the network, comprises:
    receiving, from a base station, an allocation of the portion of the resource from the sidelink resource pool.
3. The method of clause 1 or 2, wherein reserving the portion of the resources from the sidelink resource pool available to the plurality of first UEs in the network, comprises:
    selecting, at the first UE, the portion of the resource from the sidelink resource pool by identifying a resource reservation period; and
    transmitting a sidelink control information (SCI) that identifies the portion of the resource from the sidelink resource pool that are being reserved by the first UE and a resource reservation period.
4. The method of any of the preceding clauses 1-3, wherein generating resource information for one or more second UEs associated with the first UE, comprises:
    allocating a forward sidelink communication resources within the portion of resources that are reserved for the first UE;
    allocating a reverse sidelink communication resources within the portion of resources that are reserved for the first UE; and
    generating resource information that includes information about one or both of the forward sidelink communication resources and the reverse sidelink communication resources.
5. The method of any of the preceding clauses 1-4, transmitting the resource message to the one or more second UEs that includes the resource information, comprises:
    transmitting a first resource message to the one or more second UE regarding the forward sidelink communication resources; and
    transmitting a second resource message to the one or more second UE regarding the reverse sidelink communication resources.
6. The method of any of the preceding clauses 1-5, transmitting the resource message to the one or more second UEs that includes the resource information, comprises:
    transmitting the resource message to the one or more second UEs includes the resource information regarding both forward sidelink communication resources and reverse sidelink communication resources.
7. The method of any of the preceding clauses 1-6, wherein transmitting the resource message to the one or more second UEs that includes the resource information, comprises:
    transmitting a resource pool index identifying the portion of the resources that are reserved for the first UE to be used for sidelink communication between the first UE and the one or more second UEs.
8. The method of any of the preceding clauses 1-7, wherein transmitting the resource message to the one or more second UEs that includes the resource information, comprises:
    transmitting the resource message in a physical sidelink shared channel (PSSCH) to the one more second UEs identifying the portion of the resources from the sidelink resource pool that have been reserved for the first UE
9. The method of any of the preceding clauses 1-8, wherein transmitting the resource message to the one or more second UEs that includes the resource information, comprises:
    transmitting one or more of time domain resource assignment (TDRA), frequency domain resource assignment (FDRA), resource reservation period association with the portion of the resources that are reserved for the first UE from the sidelink resource pool in a sidelink control information (SCI) message.
10. The method of any of the preceding clauses 1-9, wherein the search space for monitoring transmissions within the set of subchannels that are calculated based on the portion of the resources that have been reserved for the first UE from the sidelink resource pool comprises:
    identifying a subset of the subchannels from the set of subchannels in the search space that fall outside of the portion of the resources that are reserved for the first UE; and
    omitting transmissions received in the identified subset of the subchannels.

11. The method of any of the preceding clauses 1-10, wherein the search space for monitoring transmissions within the set of subchannels that are calculated based on the portion of the resources that have been reserved for the first UE from the sidelink resource pool comprises:
  determining the set of subchannels that are within the portion of the resources that have been reserved for the first UE from the sidelink resource pool; and
  monitoring sidelink communications in one or more of the set of subchannels.

12. An apparatus for wireless communications, comprising:
  at least one processor;
  and memory coupled to the at least one processor, the memory including instructions executable by the at least one processor to cause the apparatus to:
    reserve, at a first user equipment (UE), a portion of resources from a sidelink resource pool available to a plurality of first UEs in a network;
    generate resource information for one or more second UEs associated with the first UE that identifies the portion of the resources from the sidelink resource pool that have been reserved for the first UE, wherein the portion of the resources that are reserved for the first UE are to be used for sidelink communication between the first UE and the one or more second UEs; and
    transmit a resource message to the one or more second UEs that includes the resource information, wherein the resource information is used to configure search space for monitoring transmissions within a set of subchannels that are calculated based on the portion of the resources that have been allocated to the first UE from the sidelink resource pool.

13. The apparatus of clause 12, wherein the instructions to reserve the portion of the resources from the sidelink resource pool available to the plurality of first UEs in the network are further executable by the at least one processor to cause the apparatus to:
  receive, from a base station, an allocation of the portion of the resource from the sidelink resource pool.

14. The apparatus of clauses 12 or 13, wherein the instructions to reserve the portion of the resources from the sidelink resource pool available to the plurality of first UEs in the network are further executable by the at least one processor to cause the apparatus to:
  select, at the first UE, the portion of the resource from the sidelink resource pool by identifying a resource reservation period; and
  transmit a sidelink control information (SCI) that identifies the portion of the resource from the sidelink resource pool that are being reserved by the first UE and a resource reservation period.

15. The apparatus of any of the preceding clauses 12-14, wherein the instructions to generate resource information for one or more second UEs associated with the first UE are further executable by the at least one processor to cause the apparatus to:
  allocate a forward sidelink communication resources within the portion of resources that are reserved for the first UE;
  allocate a reverse sidelink communication resources within the portion of resources that are reserved for the first UE; and
  generate resource information that includes information about one or both of the forward sidelink communication resources and the reverse sidelink communication resources.

16. The apparatus of any of the preceding clauses 12-15, wherein the instructions to transmit the resource message to the one or more second UEs that includes the resource information are further executable by the at least one processor to cause the apparatus to:
  transmitting a first resource message to the one or more second UE regarding the forward sidelink communication resources; and
  transmitting a second resource message to the one or more second UE regarding the reverse sidelink communication resources.

17. The apparatus of any of the preceding clauses 12-16, wherein the instructions to transmit the resource message to the one or more second UEs that includes the resource information are further executable by the at least one processor to cause the apparatus to:
  transmitting the resource message to the one or more second UEs includes the resource information regarding both forward sidelink communication resources and reverse sidelink communication resources.

18. The apparatus of any of the preceding clauses 12-17, wherein the instructions to transmit the resource message to the one or more second UEs that includes the resource information are further executable by the at least one processor to cause the apparatus to:
  transmit a resource pool index identifying the portion of the resources that are reserved for the first UE to be used for sidelink communication between the first UE and the one or more second UEs.

19. The apparatus of any of the preceding clauses 12-18, wherein the instructions to transmit the resource message to the one or more second UEs that includes the resource information are further executable by the at least one processor to cause the apparatus to:
  transmit the resource message in a physical sidelink shared channel (PSSCH) to the one more second UEs identifying the portion of the resources from the sidelink resource pool that have been reserved for the first UE 20. The apparatus of any of the preceding clauses 12-19, wherein the instructions to transmit the resource message to the one or more second UEs that includes the resource information are further executable by the at least one processor to cause the apparatus to:
  transmit one or more of time domain resource assignment (TDRA), frequency domain resource assignment (FDRA), resource reservation period association with the portion of the resources that are reserved for the first UE from the sidelink resource pool in a sidelink control information (SCI) message.

21. The apparatus of any of the preceding clauses 12-20, wherein the search space for monitoring transmissions within the set of subchannels that are calculated based on the portion of the resources that have been reserved for the first UE from the sidelink resource pool is further executable by the at least one processor to cause the apparatus to:
  identify a subset of the subchannels from the set of subchannels in the search space that fall outside of the portion of the resources that are reserved for the first UE; and
  omit transmissions received in the identified subset of the subchannels.

22. The apparatus of any of the preceding clauses 12-21, wherein the search space for monitoring transmissions within the set of subchannels that are calculated based on the portion of the resources that have been reserved for the first UE from the sidelink resource pool is further executable by the at least one processor to cause the apparatus to:

determine the set of subchannels that are within the portion of the resources that have been reserved for the first UE from the sidelink resource pool; and monitor sidelink communications in one or more of the set of subchannels.

23. A method for wireless communications, comprising:

receiving, at a first user equipment (UE), a resource message from a second UE that includes a resource information regarding a portion of resources that have been reserved by the second UE from a sidelink resource pool available;

configuring a search space for sidelink communication between the first UE and the second UE based on the resource information, wherein the search space is a subset of subchannels calculated based in part on the portion of resources that have been reserved by the second UE;

monitoring, at the first UE, the subset of subchannels for sidelink transmissions from the second UE that are within the search space; and decoding the sidelink transmissions from the second UE based on the monitoring of the subset of subchannels.

24. The method of clauses 23, wherein receiving the resource message from the second UE, comprises:

receiving a sidelink control information (SCI) that identifies the portion of the resource from the sidelink resource pool that are being reserved by the second UE and a resource reservation period.

25. The method of any of the preceding clauses 23-24, wherein receiving the resource message from the second UE, comprises:

receiving a first resource message regarding forward sidelink communication resources within the portion of resources that are reserved for the second UE; and receiving a second resource message regarding reverse sidelink communication resources that are reserved for the second UE.

26. The method of any of the preceding clauses 23-25, wherein receiving the resource message from the second UE, comprises:

receiving the resource message that includes the resource information regarding both a forward sidelink communication resources and a reverse sidelink communication resources that are reserved for the second UE.

27. The method of any of the preceding clauses 23-26, wherein receiving the resource message from the second UE, comprises:

receiving a resource pool index identifying the portion of the resources that are reserved for the second UE to be used for sidelink communication between the first UE and the second UE.

28. The method of any of the preceding clauses 23-27, wherein receiving the resource message from the second UE, comprises:

receiving the resource message in a physical sidelink shared channel (PSSCH) to identifying the portion of the resources from the sidelink resource pool that have been reserved for the second UE 29. The method of any of the preceding clauses 23-28, wherein receiving the resource message from the second UE, comprises:

receiving one or more of time domain resource assignment (TDRA), frequency domain resource assignment (FDRA), resource reservation period association with the portion of the resources that are reserved for the second UE from the sidelink resource pool in a sidelink control information (SCI) message.

30. An apparatus for wireless communications, comprising:
at least one processor;
and memory coupled with the at least one processor, the memory including instructions executable by the at least one processor to cause the apparatus to:

receive, at a first user equipment (UE), a resource message from a second UE that includes a resource information regarding a portion of resources that have been reserved by the second UE from a sidelink resource pool available;

configure a search space for sidelink communication between the first UE and the second UE based on the resource information, wherein the search space is a subset of subchannels calculated based in part on the portion of resources that have been reserved by the second UE;

monitor, at the first UE, the subset of subchannels for sidelink transmissions from the second UE that are within the search space; and decode the sidelink transmissions from the second UE based on the monitoring of the subset of subchannels.

31. The apparatus of clauses 30, wherein the instructions to receive the resource message from the second UE are further executable by the at least one processor to cause the apparatus to:

receive a sidelink control information (SCI) that identifies the portion of the resource from the sidelink resource pool that are being reserved by the second UE and a resource reservation period.

32. The apparatus of any of the preceding clauses 30-31, wherein the instructions to receive the resource message from the second UE are further executable by the at least one processor to cause the apparatus to:

receive a first resource message regarding forward sidelink communication resources within the portion of resources that are reserved for the second UE; and receive a second resource message regarding reverse sidelink communication resources that are reserved for the second UE.

33. The apparatus of any of the preceding clauses 30-32, wherein the instructions to receive the resource message from the second UE are further executable by the at least one processor to cause the apparatus to:

receive the resource message that includes the resource information regarding both a forward sidelink communication resources and a reverse sidelink communication resources that are reserved for the second UE.

34. The apparatus of any of the preceding clauses 30-33, wherein the instructions to receive the resource message from the second UE are further executable by the at least one processor to cause the apparatus to:

receive a resource pool index identifying the portion of the resources that are reserved for the second UE to be used for sidelink communication between the first UE and the second UE.

35. The apparatus of any of the preceding clauses 30-34, wherein the instructions to receive the resource message from the second UE are further executable by the at least one processor to cause the apparatus to:

receive the resource message in a physical sidelink shared channel (PSSCH) to identifying the portion of the resources from the sidelink resource pool that have been reserved for the second UE 36. The apparatus of any of the preceding clauses 30-35, wherein the instructions to receive the resource message from the second UE are further executable by the at least one processor to cause the apparatus to:

receive one or more of time domain resource assignment (TDRA), frequency domain resource assignment (FDRA), resource reservation period association with the portion of the resources that are reserved for the second UE from the sidelink resource pool in a sidelink control information (SCI) message.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   reserving, at a first user equipment (UE), a portion of resources from a sidelink resource pool available to a plurality of first UEs in a network;
   generating resource information for a plurality of second UEs associated with the first UE that identifies the portion of the resources from the sidelink resource pool that have been reserved for the first UE, wherein the portion of the resources that are reserved for the first UE are to be used for sidelink communication between the first UE and the plurality of second UEs; and
   transmitting a resource message to the plurality of second UEs that includes the resource information, wherein the resource information is used to configure search space for monitoring transmissions within a set of subchannels that are calculated based on the portion of the resources that have been reserved for the first UE from the sidelink resource pool, wherein the search space for monitoring transmissions within the set of subchannels that are calculated based on the portion of the resources that have been reserved for the first UE from the sidelink resource pool comprises:
      identifying a subset of the subchannels from the set of subchannels in the search space that fall outside of the portion of the resources that are reserved for the first UE; and
      omitting transmissions received in the subset of the subchannels identified from the set of subchannels in the search space.

2. The method of claim 1, wherein reserving the portion of resources from the sidelink resource pool available to the plurality of first UEs in the network, comprises:
   receiving, from a base station, an allocation of the portion of resources from the sidelink resource pool.

3. The method of claim 1, wherein reserving the portion of resources from the sidelink resource pool available to the plurality of first UEs in the network, comprises:
   selecting, at the first UE, the portion of resources from the sidelink resource pool by identifying a resource reservation period; and
   transmitting a sidelink control information (SCI) that identifies the portion of resources from the sidelink resource pool that are being reserved by the first UE and a resource reservation period.

4. The method of claim 1, wherein generating resource information for the plurality of second UEs associated with the first UE, comprises:
   allocating a forward sidelink communication resources within the portion of resources that are reserved for the first UE;
   allocating a reverse sidelink communication resources within the portion of resources that are reserved for the first UE; and
   generating resource information that includes information about one or both of the forward sidelink communication resources and the reverse sidelink communication resources.

5. The method of claim 4, transmitting the resource message to the plurality of second UEs that includes the resource information, comprises:
   transmitting a first resource message to the plurality of second UE regarding the forward sidelink communication resources; and
   transmitting a second resource message to the plurality of second UE regarding the reverse sidelink communication resources.

6. The method of claim 4, transmitting the resource message to the plurality of second UEs that includes the resource information, comprises:
   transmitting the resource message to the plurality of second UEs includes the resource information regarding both forward sidelink communication resources and reverse sidelink communication resources.

7. The method of claim 1, wherein transmitting the resource message to the plurality of second UEs that includes the resource information, comprises:
   transmitting a resource pool index identifying the portion of the resources that are reserved for the first UE to be used for sidelink communication between the first UE and the plurality of second UEs.

8. The method of claim 1, wherein transmitting the resource message to the plurality of second UEs that includes the resource information, comprises:
transmitting the resource message in a physical sidelink shared channel (PSSCH) to the plurality of second UEs identifying the portion of the resources from the sidelink resource pool that have been reserved for the first UE.

9. The method of claim 1, wherein transmitting the resource message to the plurality of second UEs that includes the resource information, comprises:
transmitting one or more of time domain resource assignment (TDRA), frequency domain resource assignment (FDRA), resource reservation period association with the portion of the resources that are reserved for the first UE from the sidelink resource pool in a sidelink control information (SCI) message.

10. The method of claim 1, wherein the search space for monitoring transmissions within the set of subchannels that are calculated based on the portion of the resources that have been reserved for the first UE from the sidelink resource pool comprises:
determining the set of subchannels that are within the portion of the resources that have been reserved for the first UE from the sidelink resource pool; and
monitoring sidelink communications in one or more of the set of subchannels.

11. An apparatus for wireless communications, comprising:
at least one processor; and
memory coupled to the at least one processor, the memory including instructions executable by the at least one processor to cause the apparatus to:
reserve, at a first user equipment (UE), a portion of resources from a sidelink resource pool available to a plurality of first UEs in a network;
generate resource information for a plurality of second UEs associated with the first UE that identifies the portion of resources from the sidelink resource pool that have been reserved for the first UE, wherein the portion of the resources that are reserved for the first UE are to be used for sidelink communication between the first UE and the plurality of second UEs; and
transmit a resource message to the plurality of second UEs that includes the resource information, wherein the resource information is used to configure search space for monitoring transmissions within a set of subchannels that are calculated based on the portion of the resources that have been allocated to the first UE from the sidelink resource pool, wherein the search space for monitoring transmissions within the set of subchannels that are calculated based on the portion of the resources that have been reserved for the first UE from the sidelink resource pool is further executable by at least one processor to cause the apparatus to:
identify a subset of the subchannels from the set of subchannels in the search space that fall outside of the portion of the resources that are reserved for the first UE; and
omit transmissions received in the subset of the subchannels identified from the set of subchannels in the search space.

12. The apparatus of claim 11, wherein the instructions to reserve the portion of the resources from the sidelink resource pool available to the plurality of first UEs in the network are further executable by the at least one processor to cause the apparatus to:
receive, from a base station, an allocation of the portion of resources from the sidelink resource pool.

13. The apparatus of claim 11, wherein the instructions to reserve the portion of the resources from the sidelink resource pool available to the plurality of first UEs in the network are further executable by the at least one processor to cause the apparatus to:
select, at the first UE, the portion of resources from the sidelink resource pool by identifying a resource reservation period; and
transmit a sidelink control information (SCI) that identifies the portion of resources from the sidelink resource pool that are being reserved by the first UE and a resource reservation period.

14. The apparatus of claim 11, wherein the instructions to generate resource information for the plurality of second UEs associated with the first UE are further executable by the at least one processor to cause the apparatus to:
allocate a forward sidelink communication resources within the portion of resources that are reserved for the first UE;
allocate a reverse sidelink communication resources within the portion of resources that are reserved for the first UE; and
generate resource information that includes information about one or both of the forward sidelink communication resources and the reverse sidelink communication resources.

15. The apparatus of claim 14, wherein the instructions to transmit the resource message to the plurality of second UEs that includes the resource information are further executable by the at least one processor to cause the apparatus to:
transmitting a first resource message to the plurality of second UE regarding the forward sidelink communication resources; and
transmitting a second resource message to the plurality of second UE regarding the reverse sidelink communication resources.

16. The apparatus of claim 14, wherein the instructions to transmit the resource message to the plurality of second UEs that includes the resource information are further executable by the at least one processor to cause the apparatus to:
transmitting the resource message to the plurality of second UEs includes the resource information regarding both forward sidelink communication resources and reverse sidelink communication resources.

17. The apparatus of claim 11, wherein the instructions to transmit the resource message to the plurality of second UEs that includes the resource information are further executable by the at least one processor to cause the apparatus to:
transmit a resource pool index identifying the portion of the resources that are reserved for the first UE to be used for sidelink communication between the first UE and the plurality of second UEs.

18. The apparatus of claim 11, wherein the instructions to transmit the resource message to the plurality of second UEs that includes the resource information are further executable by the at least one processor to cause the apparatus to:
transmit the resource message in a physical sidelink shared channel (PSSCH) to the plurality of second UEs identifying the portion of the resources from the sidelink resource pool that have been reserved for the first UE.

19. The apparatus of claim 11, wherein the instructions to transmit the resource message to the plurality of second UEs that includes the resource information are further executable by the at least one processor to cause the apparatus to:
transmit one or more of time domain resource assignment (TDRA), frequency domain resource assignment (FDRA), resource reservation period association with the portion of the resources that are reserved for the first UE from the sidelink resource pool in a sidelink control information (SCI) message.

20. The apparatus of claim 11, wherein the search space for monitoring transmissions within the set of subchannels that are calculated based on the portion of the resources that have been reserved for the first UE from the sidelink resource pool is further executable by the at least one processor to cause the apparatus to:
determine the set of subchannels that are within the portion of the resources that have been reserved for the first UE from the sidelink resource pool; and
monitor sidelink communications in one or more of the set of subchannels.

* * * * *